(12) United States Patent
Maehashi

(10) Patent No.: US 11,069,289 B2
(45) Date of Patent: Jul. 20, 2021

(54) DISPLAY DEVICE AND ELECTRONIC EQUIPMENT

(71) Applicant: CANON KABUSHIKI KAISHA, Tokyo (JP)

(72) Inventor: Yu Maehashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/704,063

(22) Filed: Dec. 5, 2019

(65) Prior Publication Data
US 2020/0211460 A1  Jul. 2, 2020

(30) Foreign Application Priority Data

Dec. 27, 2018  (JP) .............................. JP2018-245376

(51) Int. Cl.
*G09G 3/3233* (2016.01)
*H04N 5/70* (2006.01)
*G09G 3/36* (2006.01)

(52) U.S. Cl.
CPC ......... *G09G 3/3233* (2013.01); *G09G 3/3659* (2013.01); *H04N 5/70* (2013.01); *G09G 2310/0291* (2013.01)

(58) Field of Classification Search
CPC ............... G09G 3/3233; G09G 3/3659; G09G 2310/0291; G09G 2310/027; G09G 2310/08; G09G 2320/0233; G09G 3/3275; G09G 3/3685; H04N 5/70
See application file for complete search history.

(56) References Cited

U.S. PATENT DOCUMENTS

| | | | | |
|---|---|---|---|---|
| 6,313,819 B1 * | 11/2001 | Maekawa | ............ | G09G 3/2011 345/92 |
| 2017/0162125 A1 * | 6/2017 | Liang | ................... | G09G 3/3233 |
| 2019/0355311 A1 | 11/2019 | Ota et al. | | |

FOREIGN PATENT DOCUMENTS

JP  H11-073165 A  3/1999

* cited by examiner

*Primary Examiner* — Sahlu Okebato
(74) *Attorney, Agent, or Firm* — Venable LLP

(57) ABSTRACT

A display device including pixels and column drivers configured to supply an image signal to the pixels is provided. The column drivers includes: an input node and an output node; an amplifier arranged between the input node and the output node; an offset signal holding unit arranged between the input node and the amplifier and configured to suppress a difference in offset of the amplifier among the column drivers; a current supply unit including a first terminal connected to the input node and a second terminal connected to the output node and configured to supply a current to the output node based on a voltage at the first terminal and the second terminal; and a switch arranged between the input node and the first terminal. The offset signal holding unit and the switch are connected in parallel to the input node.

17 Claims, 7 Drawing Sheets

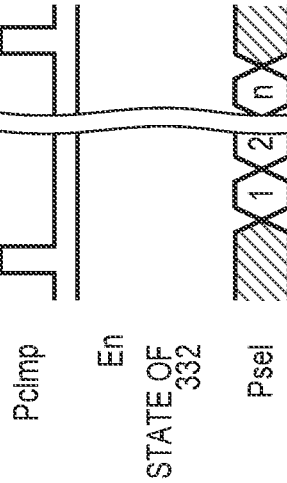
FIG. 4A
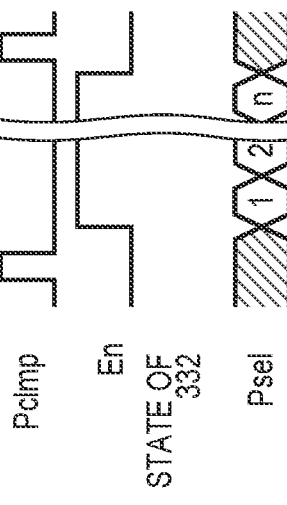
FIG. 4B
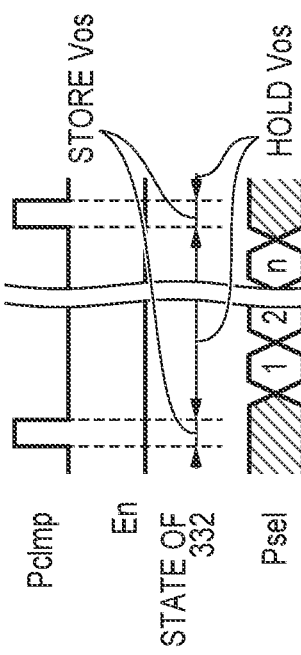
FIG. 4C

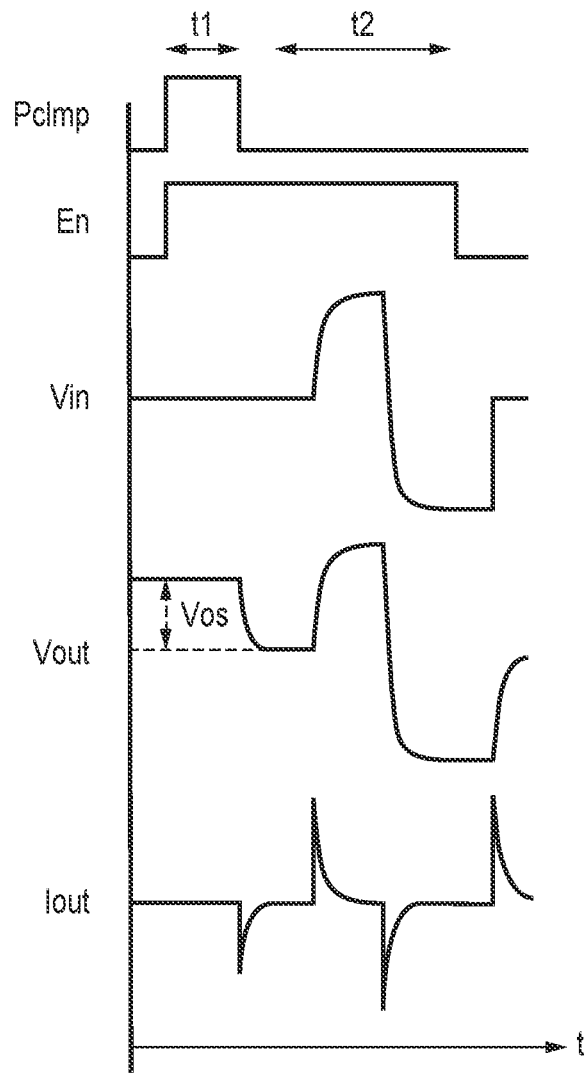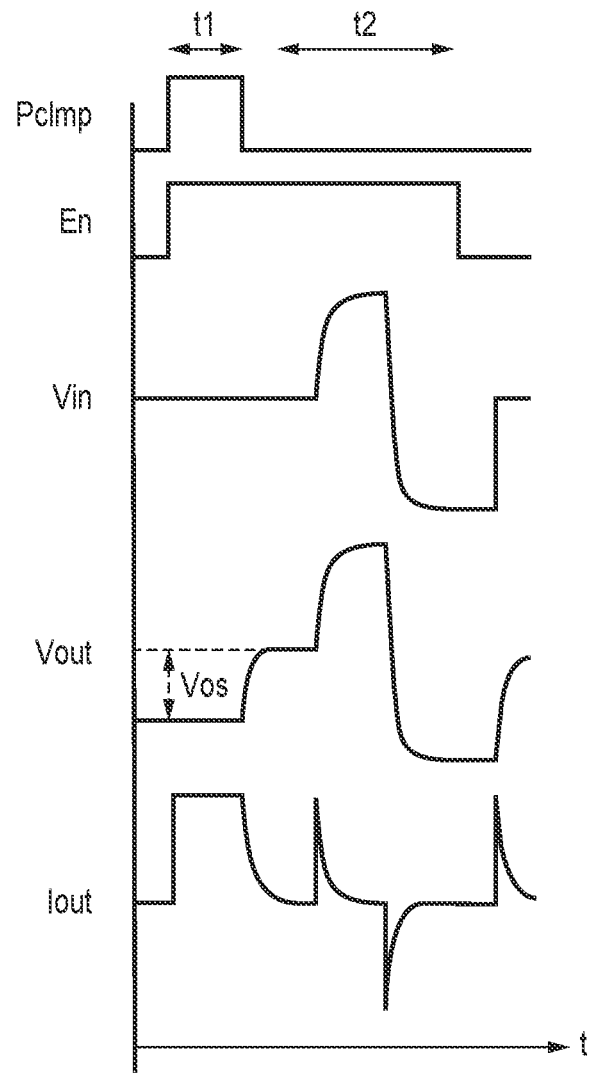

DISPLAY DEVICE AND ELECTRONIC EQUIPMENT

BACKGROUND OF THE INVENTION

Field of the Invention

The present invention relates to a display device and an electronic equipment.

Description of the Related Art

In a display device, a column driver circuit for supplying an image signal to each pixel is arranged. Japanese Patent Laid-Open No. 11-73165 describes that a source follower circuit is used as the output buffer of the column driver circuit. An offset component corresponding to a threshold voltage Vth of a source follower transistor constituting the source follower circuit is generated between the input and output of the source follower circuit. If this offset component varies due to the influence of the transistor manufacturing variation or the like, the potential output for each column varies. Japanese Patent Laid-Open No. 11-73165 describes that the offset component caused by the threshold voltage Vth of the source follower transistor is canceled and a variation in output potential among columns is suppressed.

SUMMARY OF THE INVENTION

In a display device, in order to improve display quality, it is required not only to suppress a variation among column driver circuits, but also to increase the output slew rate of the column driver circuit to operate the display device at high speed.

Some embodiments of the present invention provide a technique advantageous in operation speed of a display device while suppressing a variation among column driver circuits.

According to some embodiments, a display device including a plurality of pixels arranged in a matrix and a plurality of column driver circuits configured to supply an image signal to the plurality of pixels, wherein each of the plurality of column driver circuits includes: an input node and an output node; an amplifier arranged between the input node and the output node; an offset signal holding unit arranged between the input node and the amplifier and configured to suppress a difference in offset of the amplifier among the plurality of column driver circuits; a current supply unit including a first terminal connected to the input node and a second terminal connected to the output node, and configured to supply a current to the output node based on a voltage at the first terminal and a voltage at the second terminal; and a switch arranged between the input node and the first terminal, wherein the offset signal holding unit and the switch are connected in parallel to the input node, is provided.

Further features of the present invention will become apparent from the following description of exemplary embodiments (with reference to the attached drawings).

BRIEF DESCRIPTION OF THE DRAWINGS

FIGS. 4A to 4C are timing charts each showing the relationship between the input voltage, output voltage, and output current of the display device shown in FIG. 1;

FIGS. 5A and 5B are timing charts each showing the relationship between the input voltage, output voltage, and output current of the display device shown in FIG. 1;

DESCRIPTION OF THE EMBODIMENTS

Figure 1:
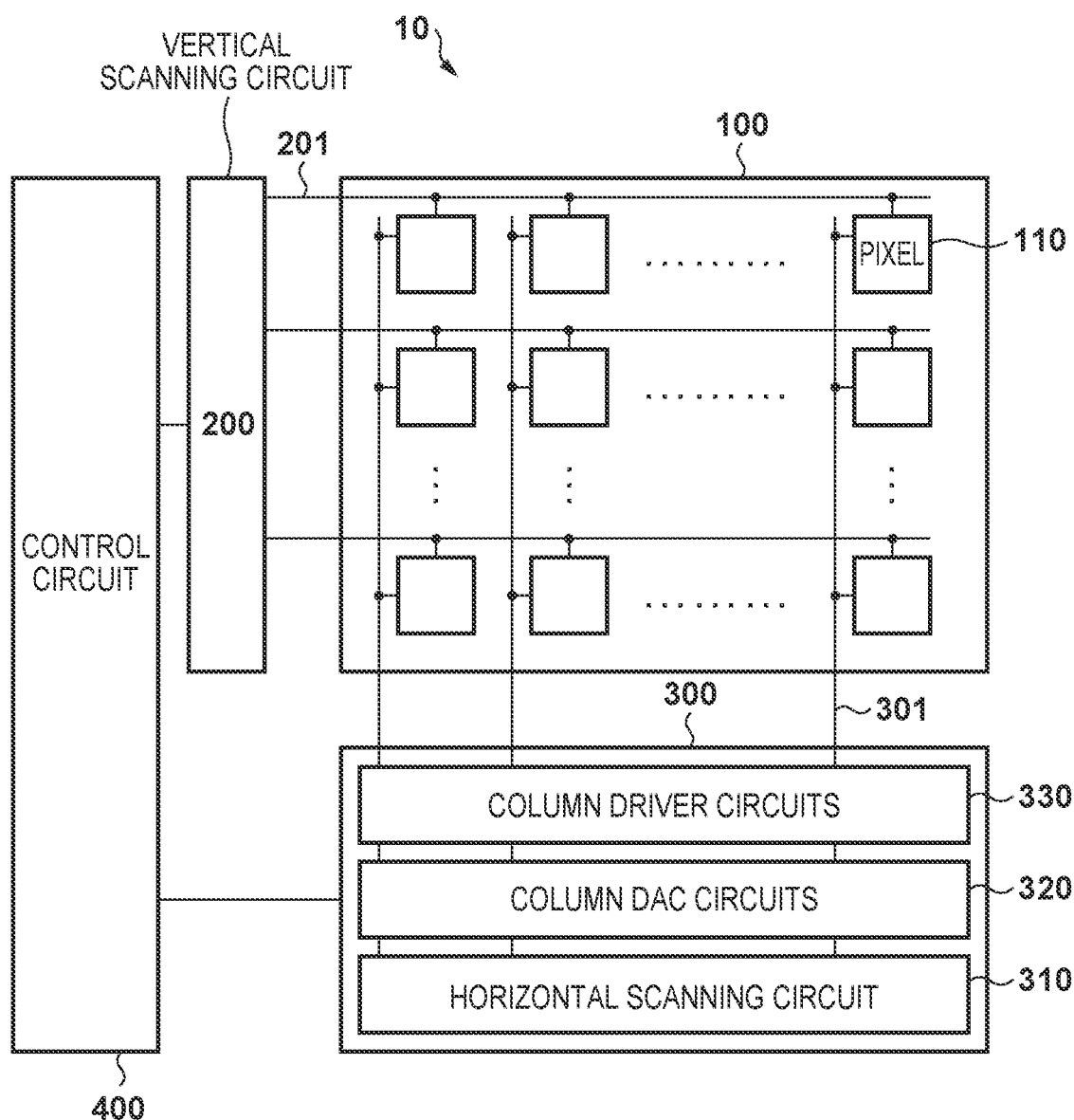
FIG. 1 is a view showing an arrangement example of a display device according to an embodiment of the present invention.

A detailed embodiment of a display device will be described below with reference to the accompanying drawings. Note that in the following description and drawings, common reference numerals denote common components throughout a plurality of drawings. Hence, the common components will be described by cross-referencing to the plurality of drawings, and a description of components denoted by common reference numerals will appropriately be omitted.

With reference to FIGS. 1 to 8, the arrangement of a display device in this embodiment will be described. FIG. 1 is a view showing an arrangement example of a display device 10 of this embodiment. The display device 10 includes a pixel array 100, a vertical scanning circuit 200, a signal output circuit 300, and a control circuit 400.

The pixel array 100 includes a plurality of pixels 110 arranged in a matrix. Each pixel 110 may include, for example, an element such as a liquid crystal element that displays an image by controlling the amount of transmitted light. In addition, each pixel 110 may include, for example, a light emission element such as an organic electroluminescence (EL) element. Each pixel 110 receives a control signal from the vertical scanning circuit 200 via a scanning line 201, and receives a luminance signal voltage serving as an image signal from the signal output circuit 300 via a signal line 301. The vertical scanning circuit 200 and the signal output circuit 300 are controlled by the control circuit 400. Here, the plurality of pixels 110 may include a plurality of subpixels arranged for respective colors, and in this case, the signal line 301 is arranged for each column based on each subpixel. For example, when one pixel includes three subpixels, three signal lines 301 can be arranged in one pixel column.

The signal output circuit 300 includes a horizontal scanning circuit 310, a plurality of column DAC (Digital/Analog Conversion) circuits 320, and a plurality of column driver circuits 330. An image signal to be input to each column scanned by the horizontal scanning circuit 310 is converted into an analog signal by the column DAC circuit 320 arranged for each column, and output as a luminance signal corresponding to the analog signal by the column driver circuit 330 similarly arranged for each column.

Figure 2:
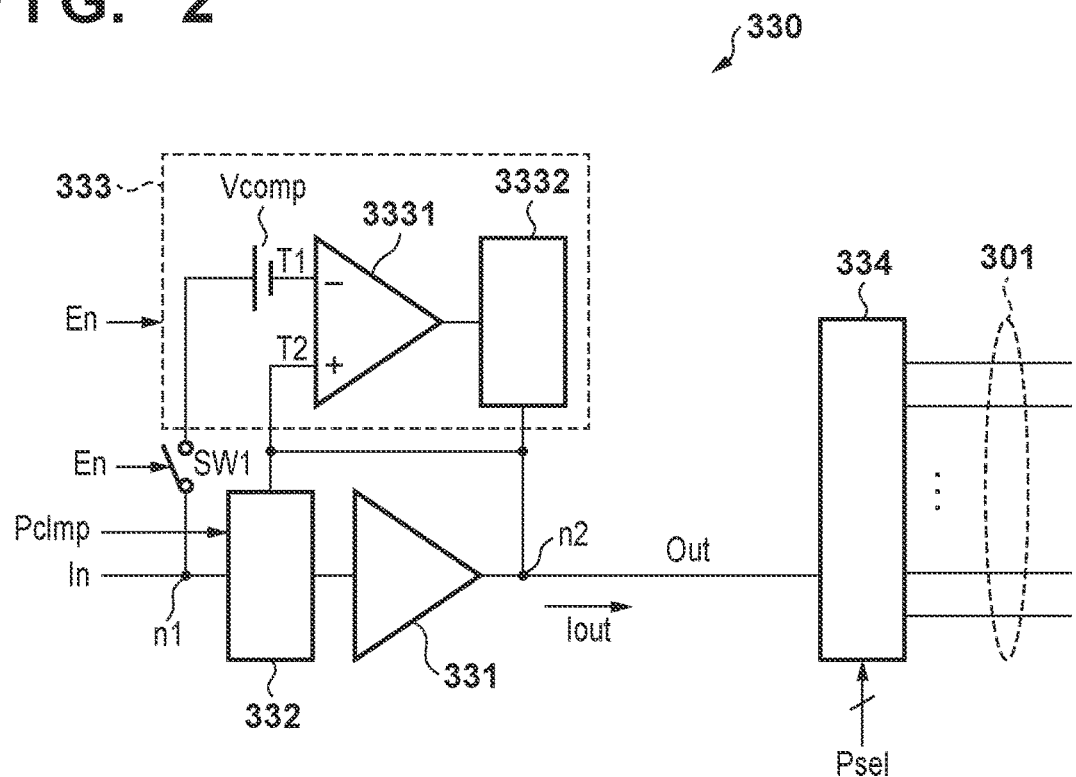
FIG. 2 is a view showing an arrangement example of a column driver circuit of the display device shown in FIG. 1.

FIG. 2 is a view showing an example of the arrangement of the column driver circuit 330. The column driver circuit 330 shown in FIG. 2 may be arranged corresponding to each signal line 301, or may be, for example, arranged corresponding to a plurality of signal lines 301 each corresponding to the subpixel or the like. Each column driver circuit includes an input node n1, an output node n2, a buffer amplifier 331 serving as an amplifier, an offset signal holding unit 332, a current supply unit 333, an output selection unit 334, and a switch SW1.

The buffer amplifier 331 is arranged between the input node n1 and the output node n2. The offset signal holding unit 332 is arranged between the input node n1 and the buffer amplifier 331 to suppress the difference in offset of the buffer amplifier 331 serving as an amplifier among the plurality of column driver circuits 330 arranged in the signal output circuit 300. When the buffer amplifier 331 includes a source follower circuit, an offset canceling structure as described in Japanese Patent Laid-Open No. 11-73165 may be used. The output selection unit 334 connects one or some of the plurality of signal lines 301 and the output node n2 in accordance with an output pixel selection signal Psel.

In order to increase the operation speed of each of the plurality of column driver circuits, the current supply unit 333 supplies a current to the output node n2 based on the voltage at a terminal T1 (first terminal) connected to the input node n1 and the voltage at a terminal T2 (second terminal) connected to the output node n2. The current supply unit 333 includes a comparator 3331 for comparing the voltage at the terminal T1 and the voltage at the terminal T2, and a supply unit 3332 that supplies a current to the output node n2 in accordance with the comparison result by the comparator 3331. The switch SW1 is arranged between the input node n1 and the terminal T1 of the current supply unit 333. The current supply unit 333 may further include, between the switch SW1 and the terminal T1, an offset unit that corrects a voltage Vin at the input node n1 using a predetermined offset voltage Vcomp. In this embodiment, a correction performed by the offset unit is a correction to subtract the offset voltage Vcomp from the voltage Vin at the input node n1. Thus, a voltage obtained by subtracting the offset voltage Vcomp from the voltage Vin at the input node n1 is supplied to the terminal T1. In this specification, the voltage at the input node n1 is denoted as Vin as described above. Similarly, the voltage at the output node n2 is denoted as Vout.

The current supply unit 333 operates when an "Hi" signal for enabling the high-speed operation of the column driver circuit 330 is input as a signal En for switching enabling/disenabling of the high-speed operation of the column driver circuit 330. When the signal En is set to Hi, the comparator 3331 compares the voltage at the terminal T1 connected to the input node n1 of the column driver circuit 330 with the voltage at the terminal T2 connected to the output terminal of the buffer amplifier 331, in other words, the output node n2 of the column driver circuit 330. At this time, if the voltage at the terminal T1 is higher than the voltage at the terminal T2, that is, if (Vin−Vcomp)>Vout, the supply unit 3332 supplies a current to the output node n2 in accordance with the comparison result to boost the voltage Vout at the output node n2 more quickly. Then, if the comparator 3331 detects that the voltage Vout at the output node n2 has been boosted and satisfies (Vin−Vcomp)≤Vout, the supply unit 3332 stops supplying the current accordingly. In addition, if the relationship between the voltage Vin at the input node n1 and the voltage Vout at the output node n2 satisfies (Vin−Vcomp)≤Vout when the signal En is set to Hi, the current supply unit 333 supplies no current to the output node n2.

Figure 3:
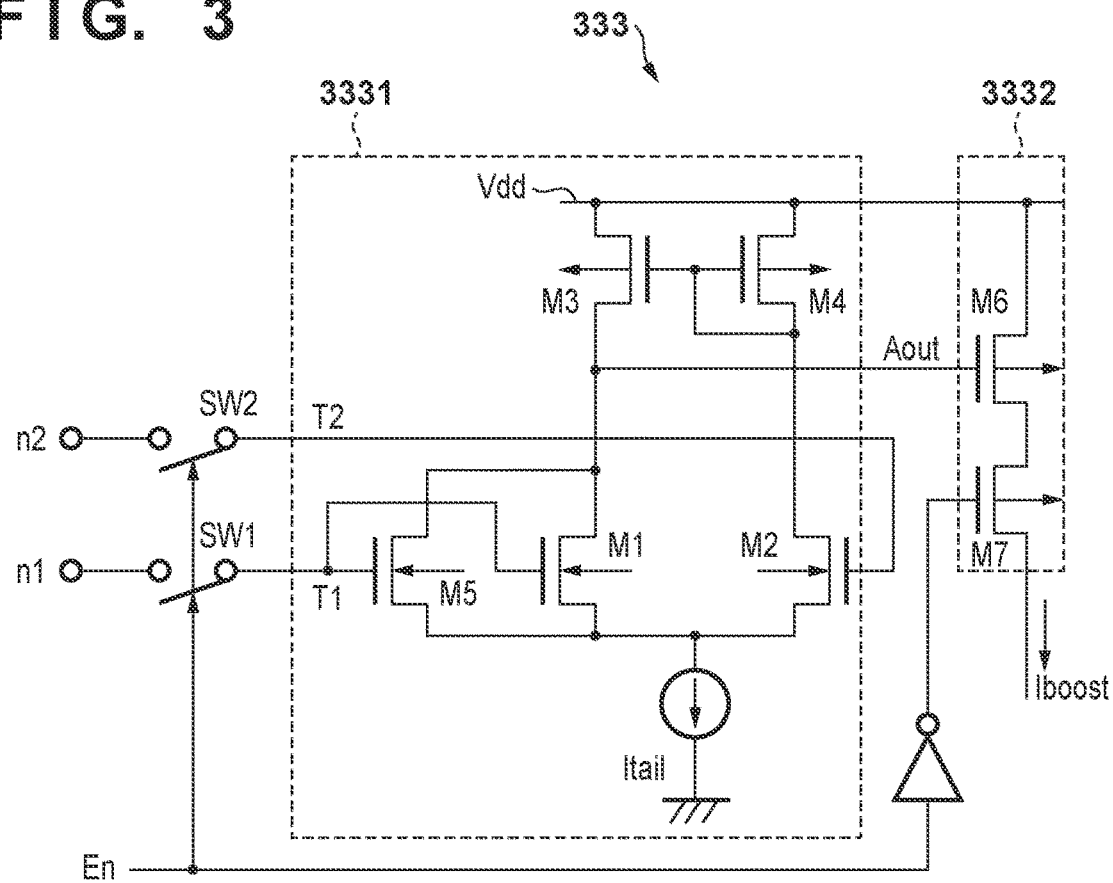
FIG. 3 is a view showing an arrangement example of a current supply unit of the display device shown in FIG. 1.

FIG. 3 is a view showing an arrangement example of the current supply unit 333. The comparator 3331 includes a transistor M1 and a transistor M2 that form a differential input stage, a transistor M3 and a transistor M4 that form a current source load, and a tail current source Itail. The gate of the transistor M1 is connected to the terminal T1, and the gate of the transistor M2 is connected to the terminal T2. The drain of each of the transistors M1 and M2 is connected to the tail current source Itail. Furthermore, the transistor M1 and the transistor M3 form a current path, and similarly, the transistor M2 and the transistor M4 form a current path. The comparator 3331 also includes a transistor M5 that functions as an offset unit for applying the offset voltage Vcomp.

As described above, the switch SW1 is arranged between the terminal T1 of the current supply unit 333 and the input node n1. The switch SW1 and the offset signal holding unit 332 are connected in parallel to the input node n1. In this embodiment, the column driver circuit 330 includes a switch SW2 (output-side switch) between the terminal T2 connected to the output node n2 of the current supply unit 333 and the output node n2. The same signal En is input to the switch SW1 and the switch SW2. That is, the switch SW1 and the switch SW2 are synchronized with each other, and the switch SW2 operates in the same open state or connected state as the switch SW1.

The supply unit 3332 includes a transistor M6 that supplies a current in accordance with a voltage Aout, which is a comparison result by the comparator 3331, and a transistor M7. The transistor M7 functions as a current supply switch for controlling connection/disconnection of a current path for supplying a current to the output node n2. The transistor M7 operates in accordance with the signal En. That is, the switch SW1 and the transistor M7 functioning as the current supply switch are synchronized with each other, and the transistor M7 operates in the same open state or connected state as the switch SW1.

Next, the operation of the column driver circuit 330 in this embodiment will be described with reference to the timing charts shown in FIGS. 4A to 4C. FIG. 4A shows a case in which the signal En is in an Lo state, the high-speed operation of the column driver circuit 330 is disenabled, and the current supply unit 333 is not operating. On the other hand, FIG. 4B shows a case in which the signal En is set to Hi, the high-speed operation of the column driver circuit is enabled, and the current supply unit 333 operates. Note that this embodiment is described assuming that the buffer amplifier 331 uses, for example, a PMOS source follower or the like, so that the current sink capability is higher than the current source capability, and increasing the source current is effective for increasing the operation speed.

One frame period for displaying one image includes a period t1 (first period) and a period t2 (second period) after the period t1. The period t1 is a preparation period for suppressing the difference in offset of the buffer amplifier 331 among the plurality of column driver circuits 330. In the period t1, a signal Pclmp is set to Hi, and the offset signal holding unit 332 starts holding the offset signal corresponding to the difference in offset of the buffer amplifier 331 among the plurality of column driver circuits 330. In this embodiment, the offset signal holding unit 332 holds an offset voltage Vos corresponding to each buffer amplifier 331 as the offset signal. This offset signal is stored in a storage unit (not shown) of the control circuit 400 or the like in advance by, for example, an inspection before shipping the display device 10, a calibration function provided in the display device 10, or the like, and supplied from the control circuit 400 to the offset signal holding unit 332 during the period t1. Also, in the period t1, the signal En is set to Lo, the current supply unit 333 supplies no current to the output node n2, and each of the switches SW1 and SW2 and the transistor M7 is in the open state. In this period t1, the voltage Vin at the input node n1 is in an initial state. In addition, the signal Psel indicates no selection, that is, the column driver circuit 330 is not connected to the signal line 301.

Then, the signal Pclmp is set to Lo and the period t1 is terminated. At this time, the offset signal holding unit 332 holds the offset voltage Vos, and an operation of suppressing the difference in offset of the buffer amplifier 331 among the column driver circuits 330 is performed when writing an image signal after the period t1. That is, the buffer amplifier 331 supplies an image signal corrected in accordance with the offset signal (offset voltage Vos) stored in the offset signal holding unit 332 to each of the plurality of pixels 110.

The period t2 is a signal writing period in which an image signal is supplied to each of the plurality of pixels 110. The voltage Vin at the input node n1 changes to a voltage value corresponding to the image signal, and the signal Psel is changed so as to connect one signal line 301 corresponding to the column address of each image signal to the column driver circuit 330.

In the period t2, unlike in the period t1, the buffer amplifier 331 needs to drive (charge) the load capacitance of the signal line 301 to supply an image signal. When the signal En is set to Lo as shown in FIG. 4A, since the current sink capability is higher than the current source capability as described above, the buffer amplifier 331 can quickly respond when dropping the voltage Vout at the output node n2. When boosting the voltage Vout at the output node n2, however, the buffer amplifier 331 cannot allow a sufficient current to flow, and requires a long settling time.

On the other hand, as shown in FIG. 4B, when the signal En is set to Hi in the period t2, the high-speed operation of the column driver circuit 330 is enabled. In accordance with the signal En, each of the switches SW1 and SW2 and the transistor M7 is set in the connected state, and the current supply unit 333 supplies a current to the output node n2 based on the voltage at the terminal T1 and the voltage at the terminal T2. When dropping the voltage Vout at the output node n2, the buffer amplifier 331 quickly responds as in the case shown in FIG. 4A. Furthermore, even when boosting the voltage Vout, since a current is supplied from the current supply unit 333 to the output node n2 in addition to a current supplied from the buffer amplifier 331, the voltage Vout at the output node n2 is boosted more quickly compared with the case shown in FIG. 4A. Thus, a quick response is possible even when boosting the voltage.

Here, consider a case in which no switch SW1 is arranged between the input node n1 and the current supply unit 333, that is, a case in which the signal En is always Hi as shown in FIG. 4C. In this case, when the voltage Vin at the input node n1 is returned to the initial state, the parasitic capacitance on the input node n1 side of the column driver circuit 330 is increased. Accordingly, it is difficult for the column DAC circuit 320 in the preceding stage of the column driver circuit 330 to quickly return the voltage Vin at the input node n1 to the initial state, and the settling time becomes long. That is, even if the settling time upon writing an image signal is shortened in the period t2, the effect for one entire frame period decreases. Therefore, in order to more effectively achieve the high-speed operation of the entire signal output circuit 300, after the period t2 in which an image signal is supplied is terminated, the signal En is set to Lo and the switch SW1 is switched to the open state. Subsequent to the period t2, the period t1 of the next one frame period may be started. Further, as shown in FIG. 4B, a period t4 (fourth period) in which no image signal is supplied to the pixel 110 and each of the switches SW1 and SW2 and the transistor M7 is set in the open state may be provided subsequent to the period t2. The period t4 is different from the period t1 in that the signal Pclmp is set to Lo.

In this embodiment, the offset signal holding unit 332 for suppressing a variation among the column driver circuits 330 is arranged. Further, not only the current supply unit 333 for allowing a more current to flow when boosting the signal voltage of the image signal is arranged, but also the switch SW1 is arranged between the current supply unit and the input node n1. With this arrangement, in the signal output circuit 300, a variation among the column driver circuits can be suppressed, and a high-speed operation can be realized. In addition, the current supply unit 333 temporarily supplies a current to the output node n2 in accordance with the comparison result between the voltage at the terminal T1 and the voltage at the terminal T2. Therefore, compared with a case of increasing the amount of current constantly supplied from the buffer amplifier 331, an increase in power consumption can be suppressed.

Furthermore, when the offset voltage Vos at the buffer amplifier 331 can have either a positive or negative polarity, the Hi period of the signal Pclmp may be arranged not to overlap with the Hi period of the signal En. As shown in FIGS. 5A and 5B, consider a case in which the Hi periods of the signal Pclmp and the signal En overlap with each other. Since (Vin−Vcomp)≤Vout when the offset voltage Vos is expressed in a positive voltage (FIG. 5A), the supply unit 3332 does not operate and the power consumption does not change. On the other hand, consider a case in which the offset voltage Vos is expressed in a negative voltage (FIG. 5B) and |Vos|>|Vcomp|. In this case, (Vin−Vcomp)>Vout holds, and the supply unit 3332 keeps supplying a current constantly during the period in which the Hi periods of the signal Pclmp and the signal En overlap with each other, and the power consumption increases.

Therefore, for example, as shown in FIG. 4B, a period t3 (third period) in which both the signal Pclmp and the signal En are set to Lo may be provided between the period t1 and the period t2 so the Hi periods of the signal Pclmp and the signal En do not overlap with each other. The period t3 is a period in which no image signal is supplied to the pixel 110 and each of the switches SW1 and SW2 and the transistor M7 is set in the open state.

In this embodiment, it has been described that the current sink capability is higher than the current source capability in the buffer amplifier 331. On the other hand, when the current source capability is higher than the current sink capability in the buffer amplifier 331 and boosting the sink current is effective to increase the operation speed, by reversing the offset voltage Vcomp and boosting the sink current by the supply unit 3332, a similar effect can be obtained.

Figure 6A:
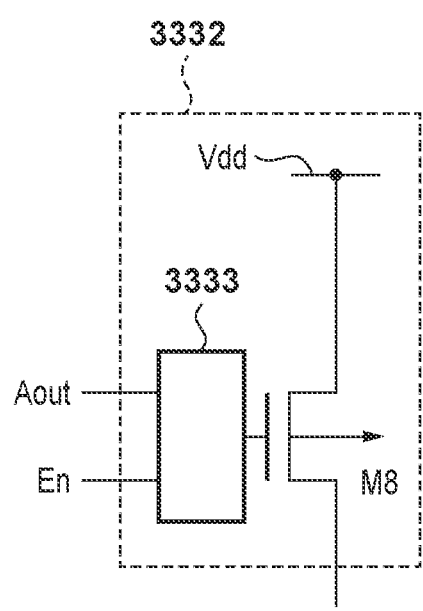
FIGS. 6A and 6B are views each showing a modification of a supply unit of the display device shown in FIG. 1.
Figure 6B:
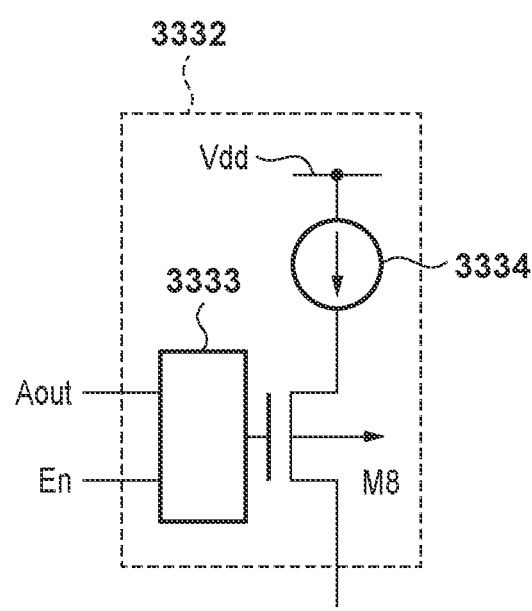

Each of FIGS. 6A and 6B shows a modification of the supply unit 3332. The supply unit 3332 is not limited to the combination of the two transistors M6 and M7 as shown in FIG. 3. For example, as shown in FIG. 6A, the supply unit 3332 may be formed by a combinational circuit 3333 to which the voltage Aout as a comparison result by the comparator 3331 and the signal En are input, and one transistor M8. In this case, since the resistance component of the current path for supplying a current from the current supply unit 333 to the output node n2 is reduced, a larger current can be supplied. Further, as shown in FIG. 6B, a constant current source 3334 may be added to the arrangement shown in FIG. 6A. In this case, the dependency of the amount of current supplied to the output node n2 on a power source voltage Vdd and the voltage Vout at the output node n2 decreases, so that the current supply from the current supply unit 333 to the output node n2 can be controlled with higher accuracy.

In addition, the offset voltage Vcomp is not limited to an offset component Vcomp0 given by the operation of the transistor M5. For example, an offset component Voscomp generated even when the transistor M5 is not operating due to the influence of mismatch between the transistor M1 and the transistor M2 or the like caused by the manufacturing variation can be included in the offset voltage Vcomp. That is, the offset voltage is expressed by Vcomp=Vcomp0+Voscomp. As described above, when (Vin−Vcomp)≤Vout, the current supply unit 333 stops supplying a current to the output node n2. Accordingly, designing the offset voltage Vcomp to be small is more advantageous in operation speed. However, the offset component Vcomp0 and the offset component Voscomp also vary in value among the plurality of column driver circuits 330. In addition, the offset component Voscomp can have either a positive or negative polarity. Therefore, in the design of the offset voltage Vcomp, it is required to increase the offset component Vcomp0 to such an extent that the influence of the variation can be ignored or to reduce the variation.

Figure 7:
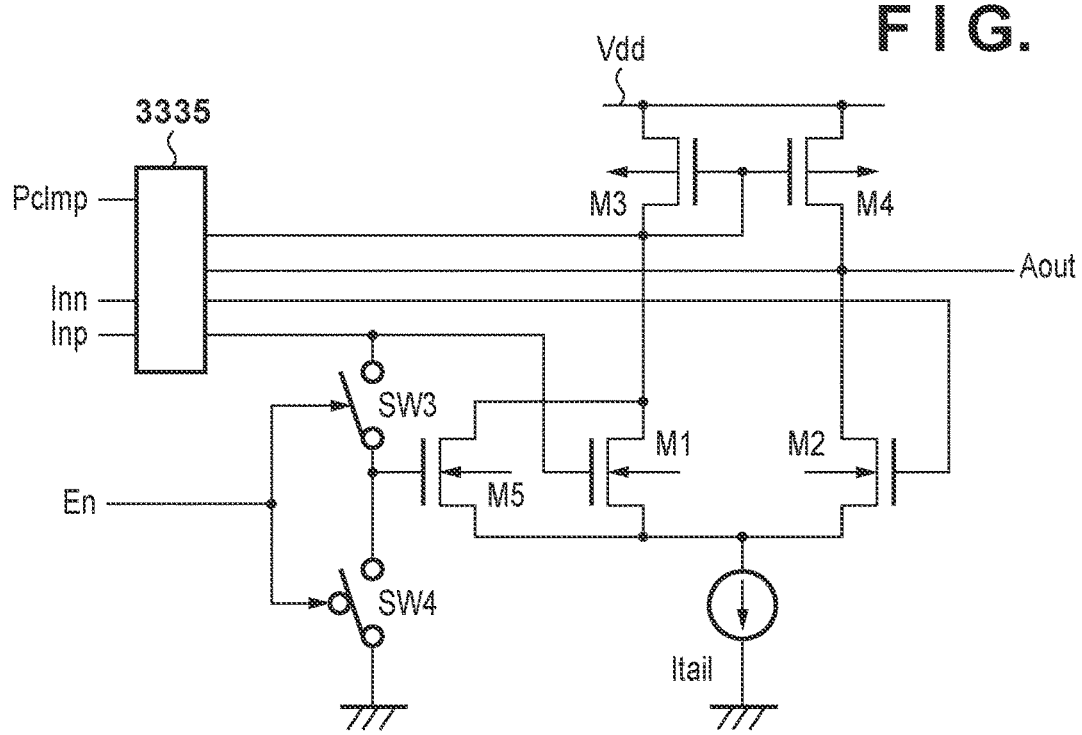
FIG. 7 is a view showing a modification of a comparator in the current supply unit shown in FIG. 3.

To cope with this, as shown in FIG. 7, the comparator 3331 may include a comparator offset signal holding unit 3335 for suppressing the difference in offset of the comparator 3331 among the plurality of column driver circuits 330. The comparator 3331 may further include switches SW3 and SW4 that switch operation/stop of the transistor M5. The switches SW3 and SW4 operate in accordance with the signal En, and the switches SW3 and SW4 can operate in the same open state or connected state as the switch SW1.

In the period t1, the comparator offset signal holding unit 3335 starts holding the offset component Voscomp. When the period 1 is terminated, the comparator offset signal holding unit 3335 holds the comparator offset signal corresponding to the difference in offset of the comparator 3331 among the plurality of column driver circuits 330. In this embodiment, the comparator offset signal holding unit 3335 holds the offset component Voscomp corresponding to each comparator 3331 as the comparator offset signal. Similar to the offset signal supplied to the offset signal holding unit 332 described above, the comparator offset signal may be stored in the storage unit of the control circuit 400 or the like in advance by, for example, an inspection before shipping the display device 10, a calibration function provided in the display device 10, or the like. The comparator offset signal is supplied from the control circuit 400 to the comparator offset signal holding unit 3335 during the period t1. Then, in the period t2, an operation of suppressing the difference in offset of the comparator 3331 among the column driver circuits 330 is performed. That is, the offset unit for applying the offset voltage Vcomp corrects the offset voltage Vcomp in accordance with the comparator offset signal (offset component Voscomp) held in the comparator offset signal holding unit 3335. Then, the offset unit corrects the voltage Vin at the input node n1 using the corrected offset voltage Vcomp. As a result, the influence of the offset component Voscomp can be reduced. That is, since the variation of the offset voltage Vcomp among the column driver circuits 330 can be reduced, the offset voltage Vcomp can be set to a smaller value.

The comparator 3331 may control the amount of current of the tail current source Itail in accordance with the signal En. For example, in the period t1, when the signal En is Lo, it may be configured that the comparator 3331 is set in a standby state and the tail current source Itail allows a desired standby current to flow. Further, for example, in the period t1, it may be configured that the comparator 3331 is set in a power-down state, and the tail current source Itail allows no current to flow. In the period t2, the tail current source Itail is set in an operating state in which a more current is allowed to flow than in the standby state or the power-down state, and supplies a current to the output node n2 in accordance with the comparison result by the comparator 3331.

Figure 8:
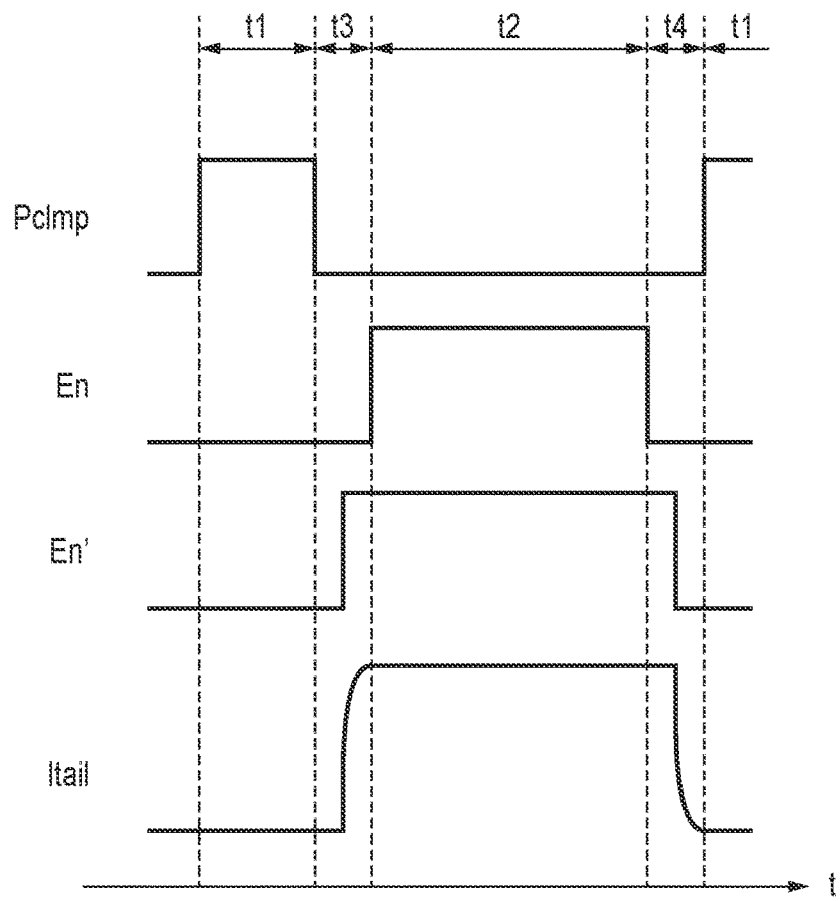
FIG. 8 is a timing chart regarding current control of the comparator in the current supply unit shown in FIG. 3.

Further, the comparator 3331 may be configured to control the current amount of the tail current source Itail in accordance with a current control pulse En'. In this case, as shown in FIG. 8, the pulse En' may be input at a timing so as to include the pulse En so that the comparator 3331 can operate stably from immediately after the signal En used to enable the high-speed operation of the column driver circuit 330 is set to Hi until the high-speed operation is disenabled. That is, as shown in FIG. 8, in the period t3 between the period t1 and the period t2, the tail current source Itail may transition from the standby state or the power-down state to the operating state. In addition, in the above-described period t4 after the period t2, the tail current source Itail may transition from the operating state to the standby state or the power-down state.

An example of the embodiment has been described above. However, the present invention is not limited to the above embodiment, as a matter of course, and the embodiment described above can be modified and combined as appropriate without departing from the scope of the present invention.

The display device 10 as described above can be incorporated in various electronic equipments. Examples of such electronic equipment can include, for example, a camera, a computer, a mobile terminal, an onboard display device, and the like. The electronic equipment can include, for example, the display device 10, and a control unit that controls driving of the display device 10.

Figure 9:
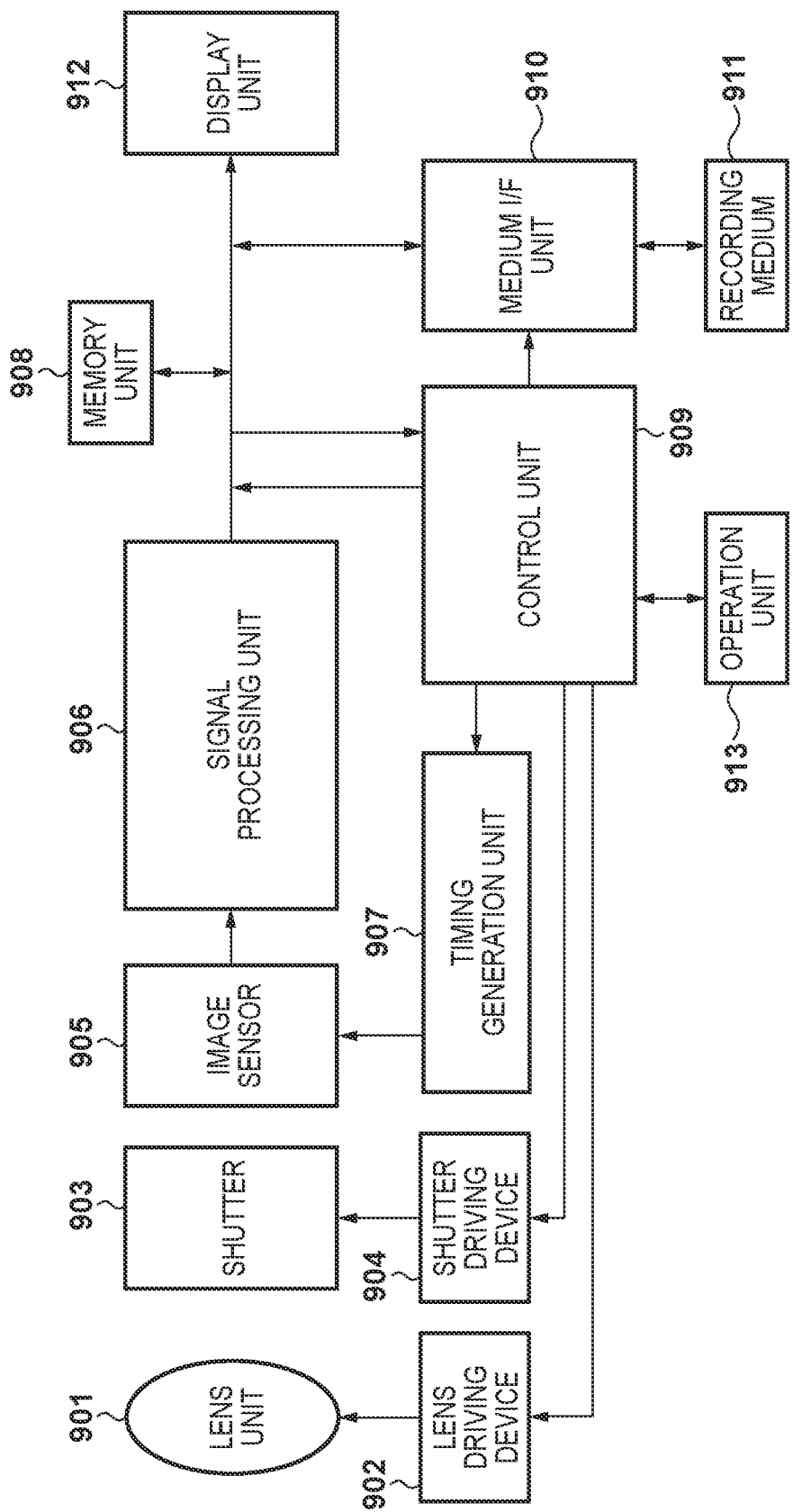
FIG. 9 is a block diagram showing an arrangement example of a camera using the display device shown in FIG. 1.

Here, an embodiment in which the display device 10 described above is applied to the display unit of a digital camera will be described with reference to FIG. 9. A lens unit 901 is an imaging optical system that forms an optical image of an object on an image sensor 905, and includes a focus lens, a magnification lens, a stop, and the like. Driving of the focus lens position, the magnification lens position, the aperture diameter of the stop, and the like in the lens unit 901 is controlled by a control unit 909 via a lens driving device 902.

A mechanical shutter 903 is arranged between the lens unit 901 and the image sensor 905, and driving thereof is controlled by the control unit 909 via a shutter driving device 904. The image sensor 905 converts the optical image formed by a plurality of pixels in the lens unit 901 into an image signal. A signal processing unit 906 performs A/D conversion, de-mosaic processing, white balance adjustment processing, encoding processing, and the like on the image signal output from the image sensor 905.

A timing generation unit 907 outputs various types of timing signals to the image sensor 905 and the signal processing unit 906. The control unit 909 includes, for example, memories (ROM and RAM) and a microprocessor (CPU). When the programs stored in the ROM are loaded to the RAM and executed by the CPU to control the respective units, the various types of functions of the digital camera are implemented. The functions implemented by the control unit 909 include automatic focus detection (AF) and automatic exposure control (AE).

A memory unit 908 is used by the control unit 909 and the signal processing unit 906 to temporality store an image signal or as a work area. A medium I/F unit 910 is an interface for performing reading and writing of a recording medium 911 which is a removable memory card, for example. A display unit 912 displays a captured image and various kinds of information of the digital camera. The display device 10 described above can be applied to the display unit 912. The display device 10 mounted in the digital camera as the display unit 912 is driven by the control unit 909 and displays an image and various kinds of information. An operation unit 913 is a user interface, such as s power switch, a release button, and a menu button, for a user to give instructions and settings to the digital camera.

Next, the operation of the digital camera at the time of capturing will be described. When the power is turned on, a capturing standby state is set. The control unit 909 starts display processing for displaying an image or various kinds of information on the display unit 912 (display device 10). If a capturing preparation instruction (for example, half-pressing of the release button of the operation unit 913) is input in the capturing standby state, the control unit 909 starts focus detection processing.

Then, the control unit 909 calculates the moving amount and moving direction of the focus lens of the lens unit 901 from the obtained defocus amount and direction, drives the focus lens via the lens driving device 902, and adjusts the focus of the imaging optical system. After the driving, if necessary, focus detection based on a contrast evaluation value may be further performed to finely adjust the focus lens position.

Thereafter, if a capturing start instruction (for example, full-pressing of the release button) is input, the control unit 909 executes a capturing operation for recording, and the obtained image signal is processed by the signal processing unit 906 and stored in the memory unit 908. Then, the control unit 909 records the image signal stored in the memory unit 908 in the recording medium 911 via the medium I/F unit 910. At this time, the control unit 909 may drive the display unit 912 (display device 10) to display the captured image. The control unit 909 may output the image signal from an external I/F unit (not shown) to an external apparatus such as a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-245376, filed Dec. 27, 2018 which is hereby incorporated by reference herein in its entirety.

What is claimed is:

1. A display device including a plurality of pixels arranged in a matrix and a plurality of column driver circuits configured to supply an image signal to the plurality of pixels,
wherein each of the plurality of column driver circuits includes:
(a) an input node and an output node;
(b) an amplifier arranged between the input node and the output node;
(c) an offset signal holding unit arranged between the input node and the amplifier and configured to suppress a difference in offset of the amplifier among the plurality of column driver circuits;
(d) a current supply unit including a first terminal connected to the input node and a second terminal connected to the output node, and configured to supply a current to the output node based on a voltage at the first terminal and a voltage at the second terminal; and
(e) a switch arranged between the input node and the first terminal,
wherein a current path passing through the offset signal holding unit and a current path passing through the switch are arranged in parallel between the input node and the output node,
wherein the current supply unit includes a comparator comprising two input terminals, and
wherein a signal input to one of the two input terminals is associated with a signal input to the first terminal and a signal input to the other of the two input terminals is associated with a signal input to the second terminal.

2. The device according to claim 1, wherein each of the plurality of column driver circuits further includes an output-side switch arranged between the output node and the second terminal.

3. The device according to claim 2, wherein the output-side switch operates in the same open state or connected state as the switch.

4. The device according to claim 1, wherein the current supply unit further includes a current supply switch configured to control connection/disconnection of a current path for supplying a current to the output node.

5. The device according to claim 4, wherein the current supply switch operates in the same open state or connected state as the switch.

6. The device according to claim 1, wherein the amplifier includes a source follower circuit.

7. The device according to claim 1, wherein the current supply unit further includes an offset unit arranged between the switch and the first terminal and configured to correct the voltage at the input node using a predetermined offset voltage.

8. The device according to claim 7, wherein a correction performed by the offset unit is a correction to subtract the predetermined offset voltage from the voltage at the input node, and
wherein a voltage obtained by subtracting the predetermined offset voltage from the voltage at the input node is supplied to the first terminal.

9. The device according to claim 1, wherein in a first period, the offset signal holding unit starts holding an offset signal corresponding to a difference in offset of the amplifier among the plurality of column driver circuits, the switch is in an open state, and the current supply unit supplies no current to the output node, and
wherein in a second period after the first period, the amplifier supplies, to the plurality of pixels, an image signal corrected in accordance with the offset signal held in the offset signal holding unit, the switch is in a connected state, and the current supply unit supplies a current to the output node based on a voltage at the first terminal and a voltage at the second terminal.

10. The device according to claim 9, wherein in the second period, if a voltage at the first terminal is higher than a voltage at the second terminal, the current supply unit supplies a current to the output node.

11. The device according to claim 9, wherein the comparator is configured to compare a voltage at the first terminal and a voltage at the second terminal.

12. The device according to claim 7, wherein in a first period, the offset signal holding unit starts holding an offset signal corresponding to a difference in offset of the amplifier among the plurality of column driver circuits, the switch is in an open state, and the current supply unit supplies no current to the output node,
- wherein in a second period after the first period, the amplifier supplies, to the plurality of pixels, an image signal corrected in accordance with the offset signal held in the offset signal holding unit, the switch is in a connected state, and the current supply unit supplies a current to the output node based on a voltage at the first terminal and a voltage at the second terminal,
- wherein the comparator is configured to compare a voltage at the first terminal and a voltage at the second terminal,
- wherein the current supply unit further includes a comparator offset signal holding unit configured to suppress a difference in offset of the comparator among the plurality of column driver circuits,
- wherein in the first period, the comparator offset signal holding unit starts holding a comparator offset signal corresponding to a difference in offset of the comparator, and
- wherein in the second period, the offset unit corrects the predetermined offset voltage in accordance with the comparator offset signal held in the comparator offset signal holding unit, and corrects the voltage at the input node using the corrected predetermined offset voltage.

13. The device according to claim 11, wherein the comparator includes, to form a differential input stage, a first transistor having a gate connected to the first terminal, a second transistor having a gate connected to the second terminal, and a current source connected to a drain of each of the first transistor and the second transistor,
- wherein in the first period, the current source is set in a first state, and
- wherein in the second period, the current source is set in a second state in which a more current is allowed to flow than in the first state.

14. The device according to claim 13, wherein in the first state, the current source allows no current to flow.

15. The device according to claim 9, wherein in a third period between the first period and the second period, and in a fourth period after the second period, no image signal is supplied from the amplifier to the plurality of pixels, and the switch is in the open state.

16. The device according to claim 13, wherein in a third period between the first period and the second period, and in a fourth period after the second period, no image signal is supplied from the amplifier to the plurality of pixels, and the switch is in the open state,
- wherein in the third period, the current source transitions from the first state to the second state, and
- wherein in the fourth period, the current source transitions from the second state to the first state.

17. An electronic equipment including:
a display device according to claim 1; and
a control unit configured to control driving of the display device.

* * * * *